(12) United States Patent
Russ

(10) Patent No.: US 6,705,681 B2
(45) Date of Patent: Mar. 16, 2004

(54) TRAP-DOOR FORAGE WAGON (76) Inventor: William E. Russ, 8309 Mitchell Rd., Roscoe, IL (US) 61073

( * ) Notice: Subject to any disclaimer, the term of this patent is extended or adjusted under 35 U.S.C. 154(b) by 86 days.

(21) Appl. No.: 10/087,477

(22) Filed: Mar. 1, 2002

(65) Prior Publication Data
US 2002/0084610 A1 Jul. 4, 2002

(51) Int. Cl.$^7$ .............................. B61D 3/00; B60P 1/56
(52) U.S. Cl. ........................ 298/29; 298/31; 298/35 R; 296/25; 414/469
(58) Field of Search .............................. 298/24, 27, 29, 298/31, 32, 33, 35 R, 37, 35 M, 38; 296/25, 180, 183, 184, 146.1, 147; 414/467, 469, 579, 520

(56) References Cited

U.S. PATENT DOCUMENTS

| | | | |
|---|---|---|---|
| 855,762 A | * | 6/1907 | Emig |
| 952,169 A | | 3/1910 | Young |
| 968,511 A | * | 8/1910 | Collins |
| 1,114,350 A | | 10/1914 | Harrigan |
| 1,136,317 A | | 4/1915 | Clark |
| 1,233,148 A | | 4/1917 | Clark |
| 1,237,946 A | | 8/1917 | Olson |
| 1,540,812 A | * | 6/1925 | Smalley |
| 1,949,195 A | | 2/1934 | Yant |
| 2,304,622 A | | 12/1942 | Barrett |
| 2,663,231 A | | 12/1953 | Wood |
| 2,723,878 A | * | 11/1955 | Rockwell |
| 3,076,680 A | * | 2/1963 | Kress |
| 3,698,767 A | | 10/1972 | Hanson |
| 3,759,573 A | | 9/1973 | Rosenbaum |
| 3,993,353 A | * | 11/1976 | Reilly ...................... 298/22 R |
| 4,324,434 A | | 4/1982 | Friese |
| 4,343,511 A | | 8/1982 | Rowan et al. |
| 4,365,841 A | | 12/1982 | McLaughlin |
| 4,941,581 A | * | 7/1990 | Searles et al. ................. 298/24 |
| 5,403,062 A | * | 4/1995 | Sjostedt et al. ............. 296/181 |
| 5,871,330 A | * | 2/1999 | Davenport ................... 414/800 |
| 5,997,099 A | | 12/1999 | Collins |
| 6,481,779 B1 | * | 11/2002 | Gothier et al. ......... 296/100.13 |

* cited by examiner

Primary Examiner—D. Glenn Dayoan
Assistant Examiner—Hilary Gutman
(74) Attorney, Agent, or Firm—Leydig, Voit & Mayer, Ltd.

(57) ABSTRACT

A forage wagon is provided for loading and unloading material. The wagon generally comprises a pair of opposing sidewalls connected to a front wall and a rear wall, the walls extending vertically to define a storage chamber. Further, a bottom wall is formed by two bottom doors, each bottom door having inner and outer edges. The outer edges are pivotally connected to the opposing sidewalls. Notably, each of the two bottom doors is operable between a closed position for loading and an open position for unloading. The bottom doors rotate from the closed position to the open position under gravity. The closed position is defined by the inner edges mating to form a substantially continuous bottom wall, while the open position defined by the inner edges being spaced apart to form a large bottom opening for unloading material.

22 Claims, 12 Drawing Sheets

TRAP-DOOR FORAGE WAGON

FIELD OF THE INVENTION

The present invention relates generally to forage wagons, and more particularly relates to bottom unloading forage wagons.

BACKGROUND OF THE INVENTION

Forage wagons have been employed in the agriculture industry for collecting and disposing of large quantities of materials found in any farming operation, typically silage or haylage. Generally, a forage wagon is pulled behind or alongside a forage harvester which collects the material and loads it into a large bin or dump box defined by the wagon. The various types of harvesters are well-known and will not be described here. The large bin is mounted on a wheeled frame and a closure member is operatively connected to the bottom or the sides of the bin to dump the contents. The closure members are actuated to an open position by way of mechanical, electrical or hydraulic means.

Commonly, such closure members are not thoroughly satisfactory because they do not open with sufficient readiness, and further their designs do not dump the load freely enough. Accordingly, there exists the need to provide a forage wagon that quickly and easily unloads its contents.

BRIEF SUMMARY OF THE INVENTION

A forage wagon is provided for loading and unloading material. The wagon generally comprises a pair of opposing sidewalls connected to a front wall and a rear wall, the walls extending vertically to define a storage chamber. Further, a bottom wall is formed by two bottom doors, each bottom door having inner and outer edges. The outer edges are pivotally connected to the opposing sidewalls. Notably, each of the two bottom doors is operable between a closed position for loading and an open position for unloading. The bottom doors rotate from the closed position to the open position under gravity. The closed position is defined by the inner edges mating to form a substantially continuous bottom wall, while the open position is defined by the inner edges being spaced apart to form a bottom opening for unloading material.

According to more detailed aspects, a latch retains the bottom doors in the closed position, wherein release of the latch frees the bottom doors to swing open under gravity to the open position. An actuator is operatively connected to the bottom doors to move the bottom doors from the open position to the closed position.

In further details, the rear wall includes a rear door, the rear door having a top edge and a bottom edge, the bottom edge mating with the bottom doors, the rear door pivotally mounted adjacent the top edge.

The material exiting the bottom opening forces the rear door to pivot outwardly to form a rear opening, the rear opening and the bottom opening combining to form a large dispensing opening.

In one embodiment, the bottom doors are angled inwardly and downwardly to form a general V-shape, preferably angled at between 30° and 60° relative to vertical. Further, a pair of front wheels and a pair or rear wheels support the wagon for travel, the rear wheels each being spaced laterally outside each of the sidewalls to straddle unloaded material. Preferably, the rear wheels are not connected by an axle.

Other objectives and advantages of the invention will become more apparent from the following detailed description when taken in conjunction with the accompanying drawings.

DETAILED DESCRIPTION OF THE INVENTION

Referring now to the drawings, an embodiment of the present invention is depicted as a forage wagon 20. The wagon 20 is intended to be pulled in proximity to a forage harvester 15 which continuously blows the forage 17 into the top side of the wagon 20. The wagon 20 includes a towing bar 22 for linkage to the harvester 15, or directly to a tractor 19, as shown in FIGS. 2–7.

It can be seen that the wagon 20 is generally of a rectangular shape, as defined by a frame including four vertical posts 31, at least four transverse posts 32 extending between the rear vertical posts 31 and between front vertical posts 31, and four longitudinal beams 33 connecting the respective front posts 31 and rear posts 31. The frame is also supplemented by various support bars 37 connecting the frame members. The wagon also includes smaller vertical support members 39, which span all of the front, rear and opposing sides of the wagon 20, to provide additional support. Suffice it to say the frame 30 generally defines a rear wall 40, opposing sidewalls 42, a front wall (not shown), a top wall (not shown), and a bottom wall 44.

Figure 1:
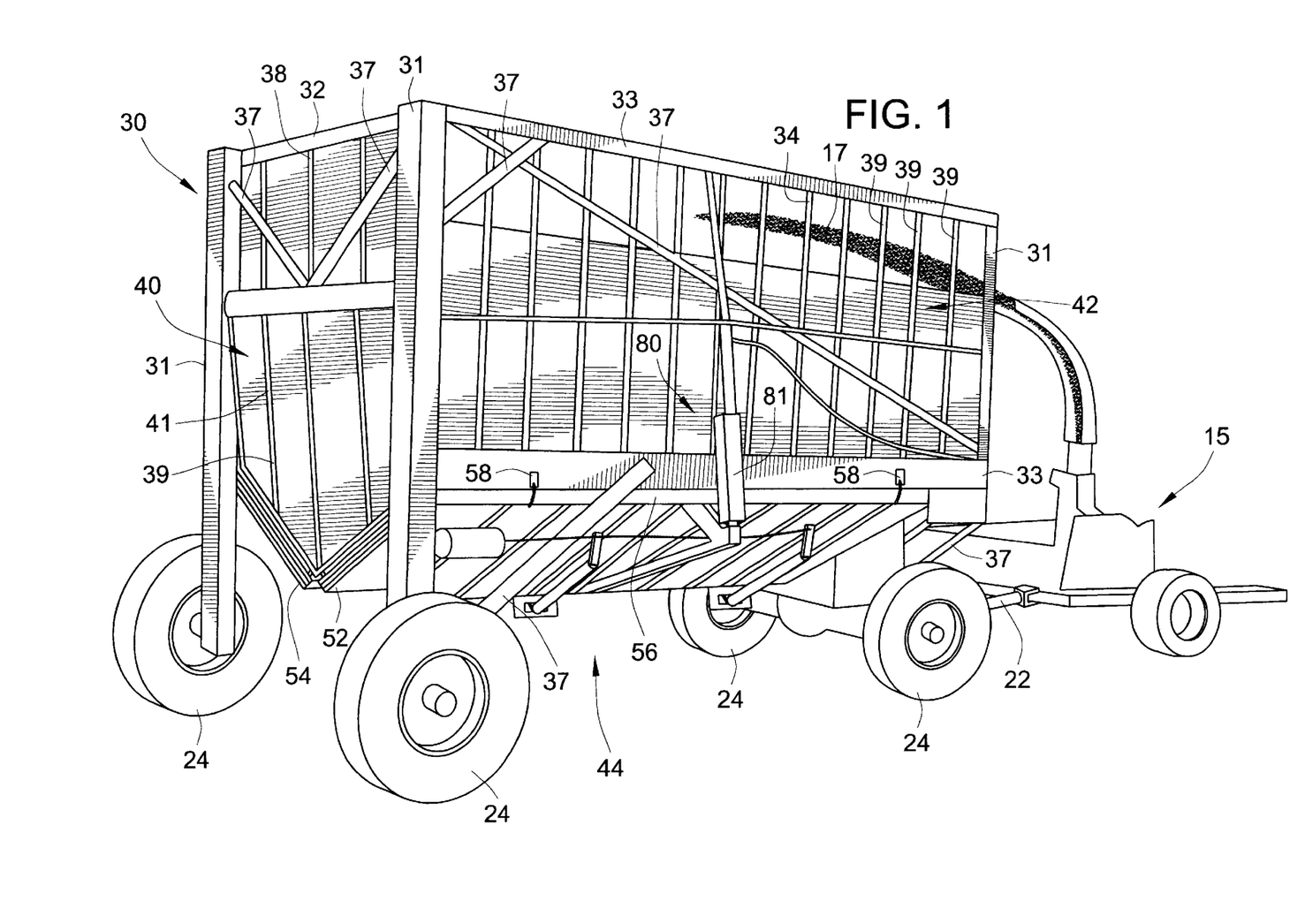
FIG. 1 depicts a perspective view of an embodiment of a forage wagon constructed in accordance with the teachings of the present invention.

The frame 30 is connected to four wheels 24, the front wheels being connected by an axle which is linked to a front portion of the frame 30, while the rear wheels are each connected to respective rear posts 31, without an axle, as will be described in more detail herein. The top wall isn't actually a wall, as the top is generally open for loading, although it may be covered by a retractable tarp, as is known in the art. The front wall is also truncated at its top, that is it does not extend all the way to the top wall, thus permitting the wagon 20 to be loaded from the front as is shown in FIG. 1. The storage bin of the wagon 20 is easily accessible from the front and the top, as well as a top edge of the side if desired. However the top edge of the sides can be closed.

In order to facilitate fast unloading of forage wagon 20, the bottom wall 44 is generally formed by two bottom doors 52, 54, which are operable between an open and closed position. Each of the bottom doors 52, 54, is generally of a rectangular shape, although they can be of any shape so long as they mate to form a substantially continuous bottom wall 44. Outer edges of the doors 52, 54 are pivotally connected to the opposing side walls 42 of the wagon. In the illustrated embodiment, the doors 52, 54 have a round bar 56 attached to its outer edge, which in turn is hingedly connected to the frame 30 at lower longitudinal member 33, by way of hinges 58. In this embodiment, the hinges 58 generally comprise a chain member wrapped around the cylindrical bar 56. Those skilled in the art will recognize that other hinged connections could be employed; for example, the cylindrical bar 56 could be rotatably connected to the frame 30 adjacent to or within the front and rear vertical posts 31. Also, an additional round bar, larger than round bar 56, could at least partially encircle the round bar 56 (i.e. a pipe within a pipe) to form hinges 58.

Figure 2:
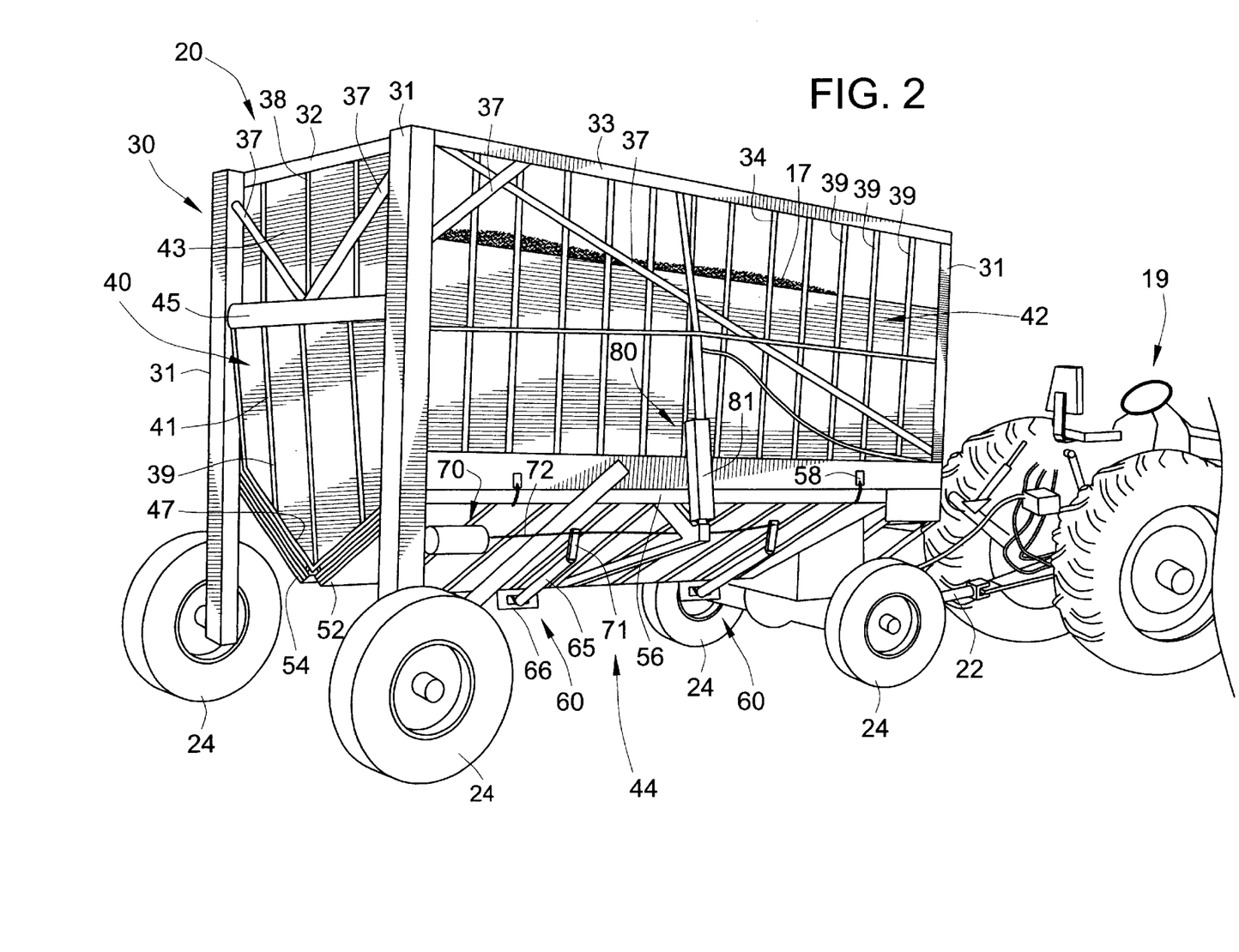
FIG. 2 is a perspective view of the wagon shown in FIG. 1, being loaded with material.
Figure 3:
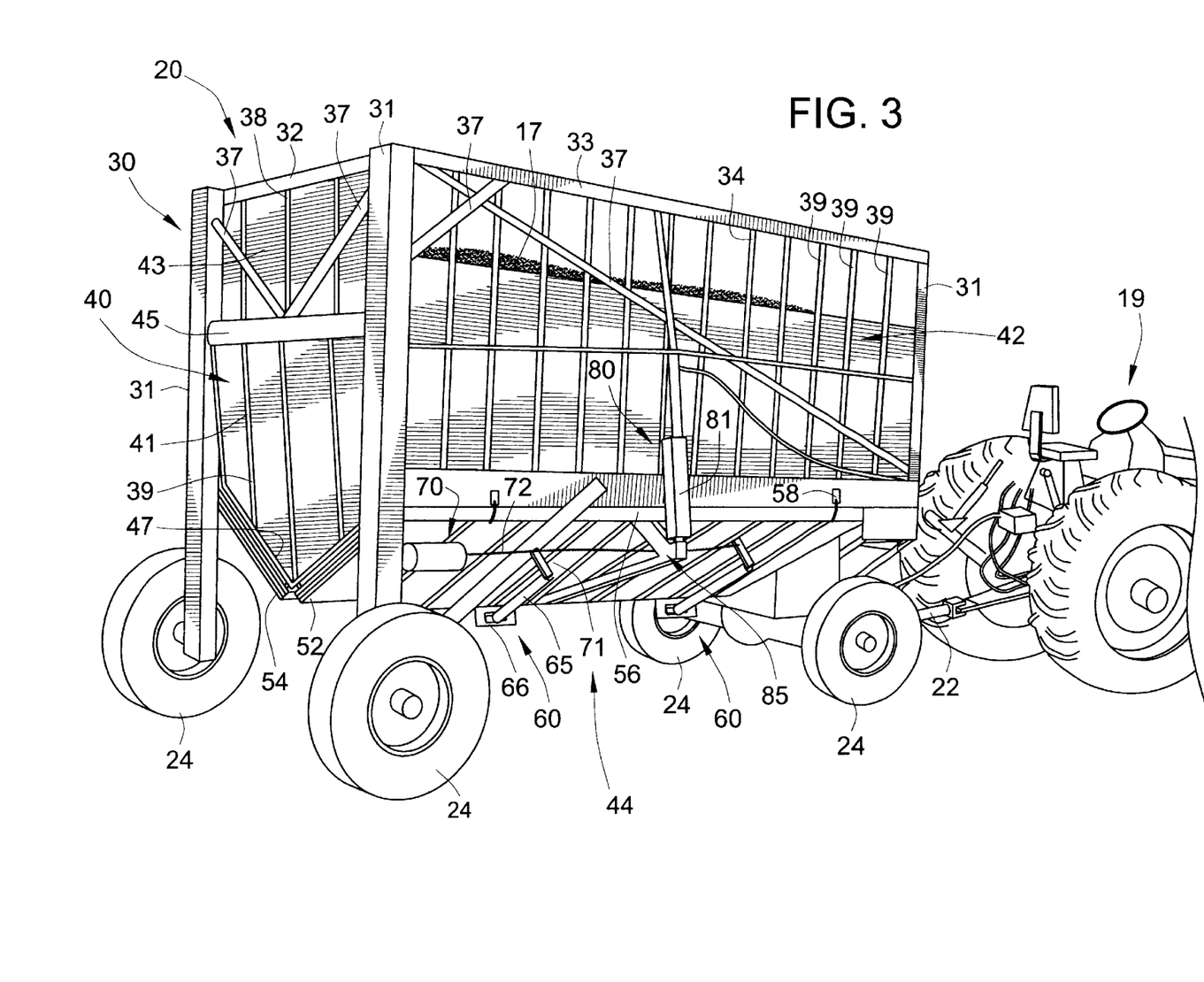
FIGS. 3–7 depict perspective views, similar to FIG. 2, showing the unloading of the forage wagon at various stages.

In the illustrated embodiment, the rear wall 40, or at least a portion thereof, is also pivotable to assist in releasing the contents of the wagon 20. The rear wall 40 generally includes a lower wall portion or rear door 41 and an upper wall portion 43. The upper portion 43 is fixed to the frame 30, while the lower portion 41 is pivotally connected to the frame 30 by way of its upper edge having a cylindrical bar 45 attached thereto which is pivotally mounted between the rear vertical posts 31. The top edge of the rear door 41 has a top edge which is pivotally mounted to the frame 30, while the bottom edge mates with the bottom doors 52, 54. That is, the lower edge 47 of the rear door 41 is shaped to match the shape of the bottom wall 44 defined by the bottom doors 52, 54, as shown in FIG. 2.

The doors 52, 54 swing about an axis generally parallel to the travel of the wagon, which is to the right in the figures. That is, the bottom doors swing about an axis extending from the rear to the front of the wagon, and hence swing under their own weight to open by gravity. It can be seen that the bottom doors 52, 54 are preferably not positioned parallel to the ground, and in fact are positioned to extend downwardly and inwardly where they meet at their inner edges. This structure further maximizes the interior space of the storage bin for holding additional material. Further, this structure provides a shorter distance for the doors 52, 54 to swing from their closed position (FIG. 2) to their open position (FIG. 5), providing a very quick response and a nearly immediate release of the material 17. The open position of the bottom doors defines a bottom opening that provides unobstructed clearance to the ground for the entire storage chamber.

The bottom wall 44 and its doors 52, 54 also minimize the travel required of the closing mechanism (described below) for easier return of the doors 52, 54, to the closed position. Preferably, the doors are angled at between 30° and 60° relative to vertical, and most preferably about 45°. The angling of the two bottom doors thus provides a general V-shape to the bottom wall 44 of the wagon 20. Accordingly, the rear wall 40, and more particularly the rear door 41 has a general V-shape formed at its bottom edge 47 to correspond to that of the bottom wall 44.

Figure 8A:
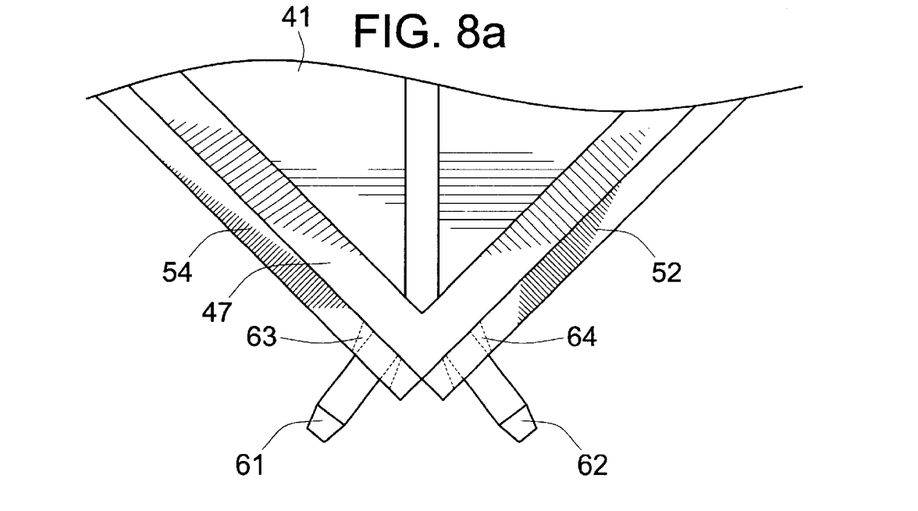
FIGS. 8a and 8b depict an end view of the wagon, partially cut away, showing how the bottom doors attach to the rear door.
Figure 8B:
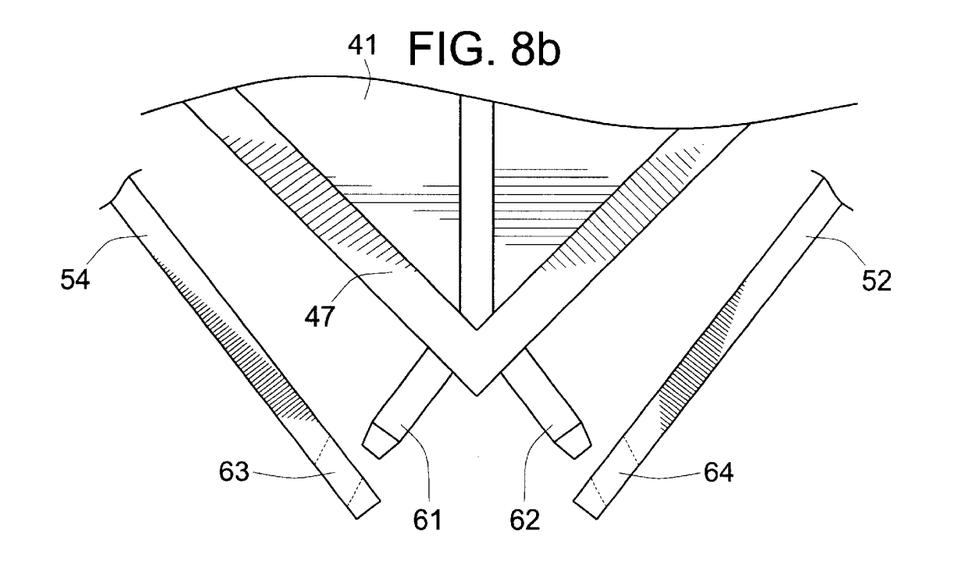

The bottom doors 52, 54 are maintained in the closed position shown in FIG. 2 by way of a latch mechanism 60, which will be described in detail with reference to FIGS. 9a–9c and 10a–10b. FIGS. 8a and 8b show a cross-sectional view taken from the rear of the rear door 41 and the two bottom doors 52, 54. The rear door 41 includes at an apex of its lower edge 47 two pegs 61, 62, one for each bottom door 52, 54. The pegs 61, 62 project downwardly and outwardly for engagement of the bottom doors. Each of the doors 52, 54 includes an aperture 63, 64 adjacent its inner edge positioned to receive the pegs 61, 62. The pegs 61, 62 are aligned along an axis partly offset from the axis of the apertures 63, 64 to assist the doors 52, 54 rotating both towards and away from the pegs 61, 62.

Figure 9A:
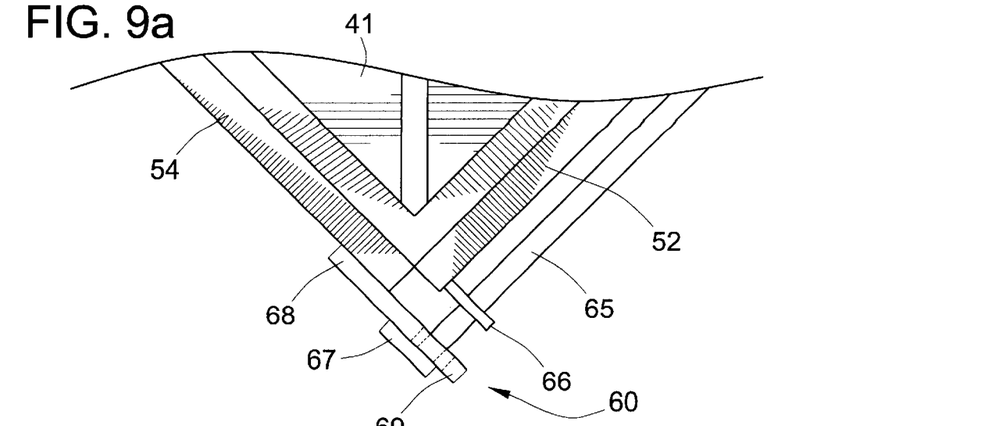
FIGS. 9a–9c show an end view, partially cut away, of the latch mechanism at various stages of operation.
Figure 9B:
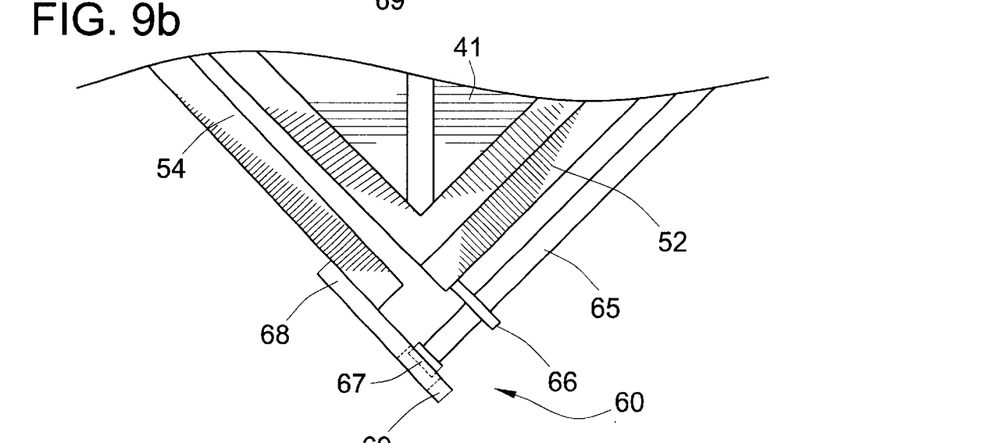
Figure 9C:
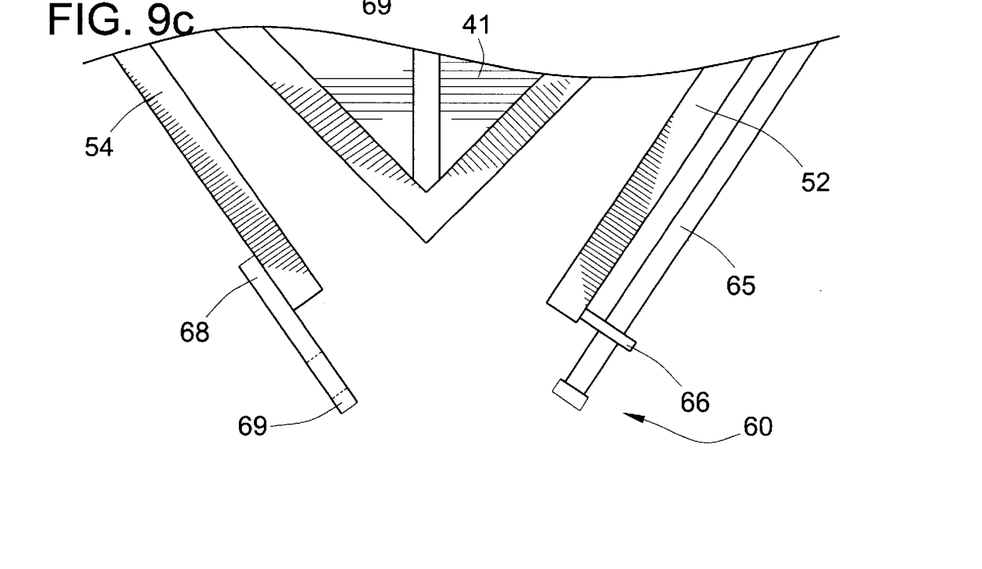

As best seen in FIGS. 9a–9c, the latch mechanism 60 generally includes an actuating arm 65 extending through a sleeve 66 fixed to the bottom of door 52 (see also FIG. 2). One end of the actuating arm 65 includes a tab 67, which extends radially from the arm 65. The other bottom door 54 includes a latch plate 68 having an aperture 69 for receiving the tab 67. The opposing end of the actuating arm 65 is operatively connected to an actuating mechanism 70 (FIG. 2) which includes a link arm 71 connected to the actuating arm 65. When the actuator 70 (preferably a hydraulic cylinder) is initialized, it moves a chain 72 which is connected to the link arm 71, causing the actuating arm 65 to rotate about its central axis. The tab 67 is thus rotated, allowing it to pass through aperture 69 in latch plate 68.

It will therefore be seen that when in the closed position, the tab 67 is rotated to a position where it engages the latch plate 68, and when the actuating arm 65 is rotated to the open position, the tab 67 rotates to a position which corresponds with the aperture 69 in the plate 68, allowing the tab 67 to pass through the aperture 69 and the doors to swing freely. This is best illustrated in FIGS. 9a–9c, showing the doors 52, 54 in a closed position (FIG. 9a), whereupon operation of the latch 60 via the actuating mechanism 70, the tab 67 passes through the aperture 69 (FIG. 9b). FIG. 9c shows the doors 52, 54 being released to swing freely towards an open position.

Figures 10A, 10B:
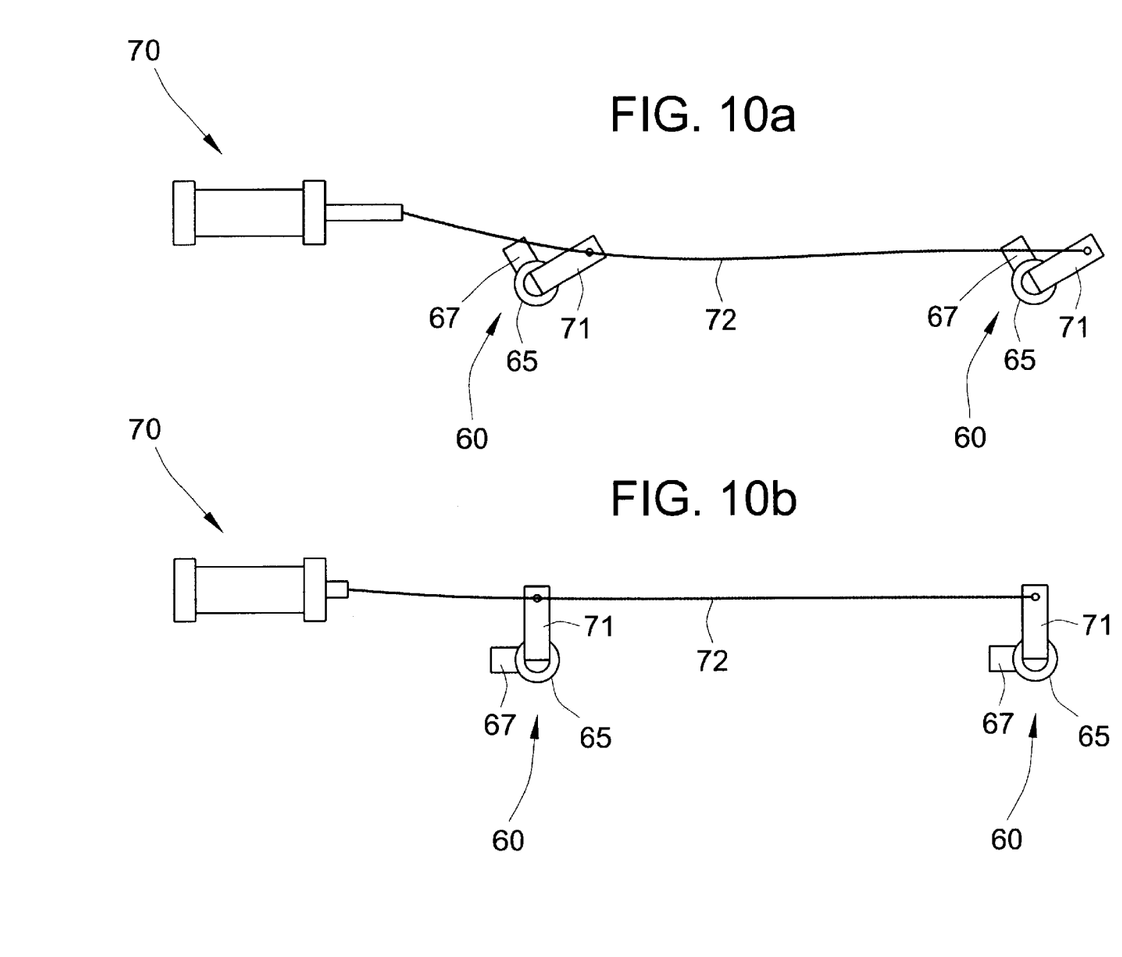
FIGS. 10a and 10b show the actuating mechanism for the latch mechanism at various stages of operation.

FIGS. 10a and 10b show the actuating mechanism in cross-sectional views, taken from a side and at a downward angle along the axis of the actuating arm 65. As shown in the figures, the actuating mechanism 70 includes a cylinder operatively connected to a chain 72 which is fed through actuating bar 71 attached to the outer end of the actuating arm 65. It can be seen in FIGS. 2, 10a and 10b that in the preferred embodiment, the doors 52, 54 are held in the closed position by two such latch mechanisms 60 spaced longitudinally along the wagon 20. FIG. 10a shows the latches 60 in an engaged position corresponding to a closed position of the bottom doors 52, 54, while FIG. 10b shows the latches in a disengaged position corresponding to an open position of the doors 52, 54.

While this particular latch mechanism has been utilized and described in this embodiment, it will be readily recognized by those having skill in the art that numerous latch mechanisms may be used to positively position the bottom doors 52, 54 in the closed position, as well as provide a quick release for rotation to the open position.

Figure 4:
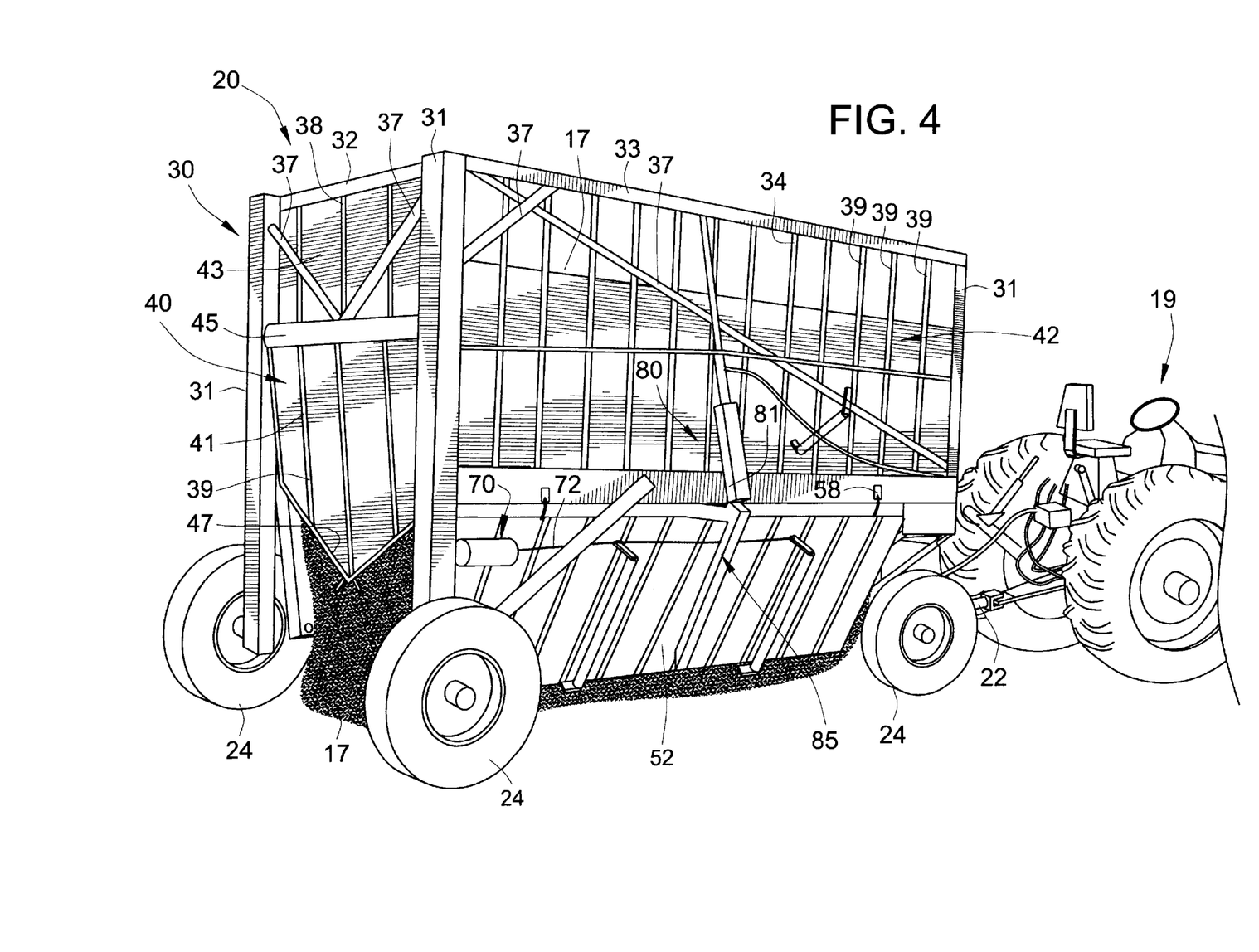
Figure 5:
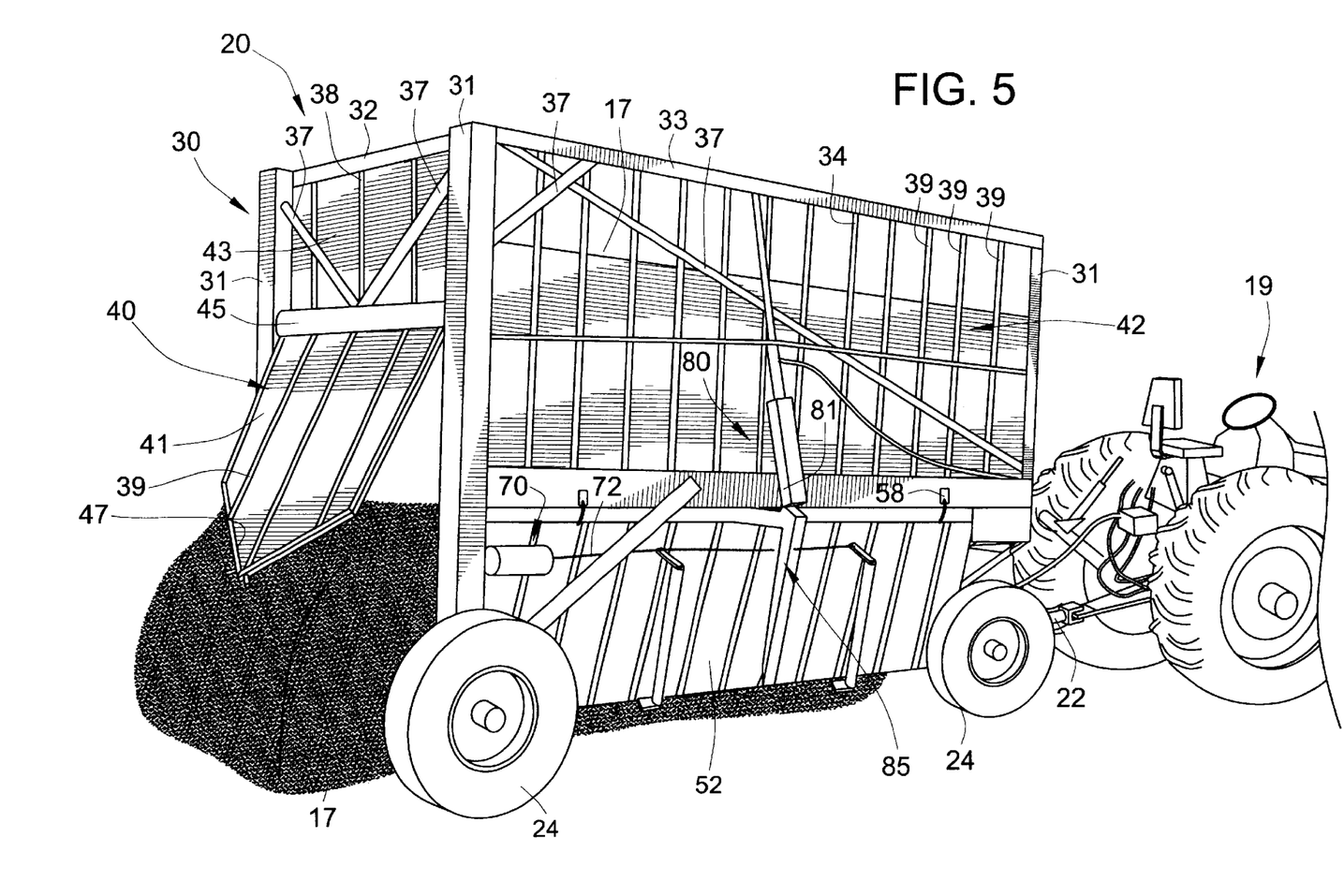

Turning now to FIGS. 3–7, the progression of dumping the contents of the wagon 30 after it has been filled with material 17 is depicted. As the tractor 19 and wagon 20 are moving forwardly, to the right in FIGS. 3–7, the actuating mechanism 70 is operated to release the latches 60 holding the bottom doors 52, 54 in the closed position. Upon release of the latches 60 (FIG. 3), the bottom doors 52, 54 are allowed to swing towards an open position under the force of gravity, pivoting about their outer edges along pivot bars 56 as previously described (FIG. 4). The material 17 is thus released, and allowed to flow downwardly through a bottom opening formed in a wagon 20 when the doors are in the open position. It can be seen that the bottom opening provides a large, unobstructed clearance to the ground for the entire storage chamber defined by the wagon 20.

Figure 6:
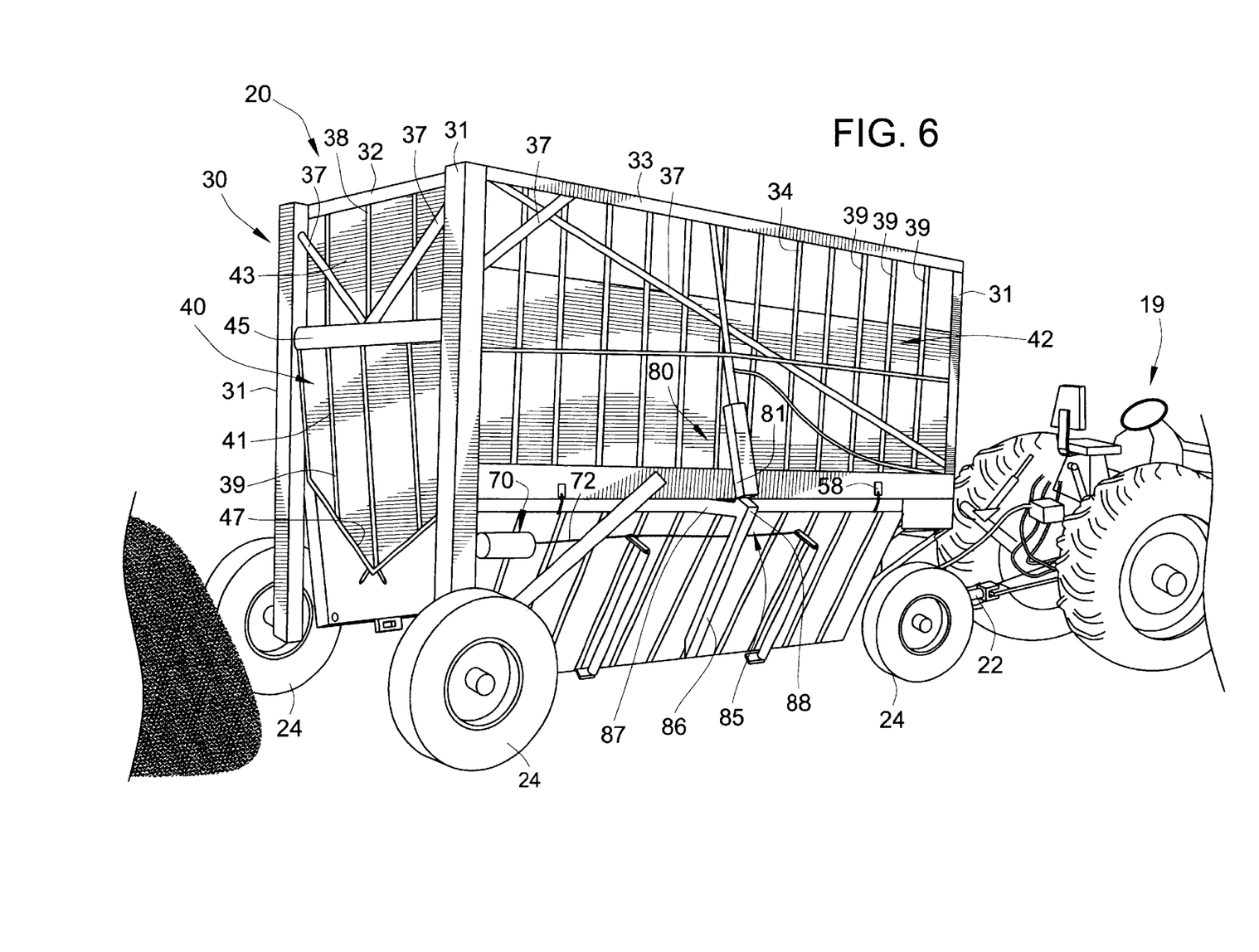

As the tractor 19 and wagon 20 move forwardly, the material 17 begins to settle on the ground, forcing the rear door 41 to rotate outwardly on its hinges, forming a rear opening. The rear opening, in combination with the bottom opening, define a dispensing opening of increased size that facilitates rapid unloading both downwardly and rearwardly (see FIG. 5). More specifically, rotation of the rear door 41 opens the wagon on a rear side or longitudinally, for increased dispensing area. Turning to FIG. 6, as the tractor 19 and wagon 20 continue to move forwardly, the material 17 has been released and is completely behind the wagon 20, and the rear door 41 is allowed to pivot back inwardly to its closed position from its open position. It can also be seen that the rear wheels 24 are spaced outwardly from the frame 30, and are not connected by an axle. Rather, the rear wheels 24 are each mounted for rotation on the respective rear posts 31 of the frame 30. As such, there is a rear opening defined between the two rear wheels 24 and the bottom edge 47 of the rear wall 40, and more specifically, the rear door 41, that is completely unobstructed.

A closing mechanism 80 is utilized to close the bottom doors 52, 54. The mechanism 80 is preferably hydraulically actuated, and is present on both sides of the wagon 20 to close the respective doors 52, 54. The actuator 81 is mounted to the frame 30 and engages a pivot arm 85, attached to each of the doors. The pivot arm 85 can clearly be seen in FIGS. 3–7. The pivot arm 85 includes a first bar 86 and a second bar 87 which are attached to the inner and outer side edges of the doors 52, 54, and combined to project laterally and outwardly from the frame 30 of the wagon 20. The pivot arm 85 extends laterally outside the frame 30, and more importantly laterally outside the pivot bar 56, and runs inwardly as the pivot bar 56 and is attached to the door 52, 54 at their outer and inner edges. The actuator 81 engages the laterally extending portion 88 of the pivot arm 85, and pushes downwardly thereon to rotate the doors 52, 54 inwardly and upwardly towards their closed position.

Figure 7:
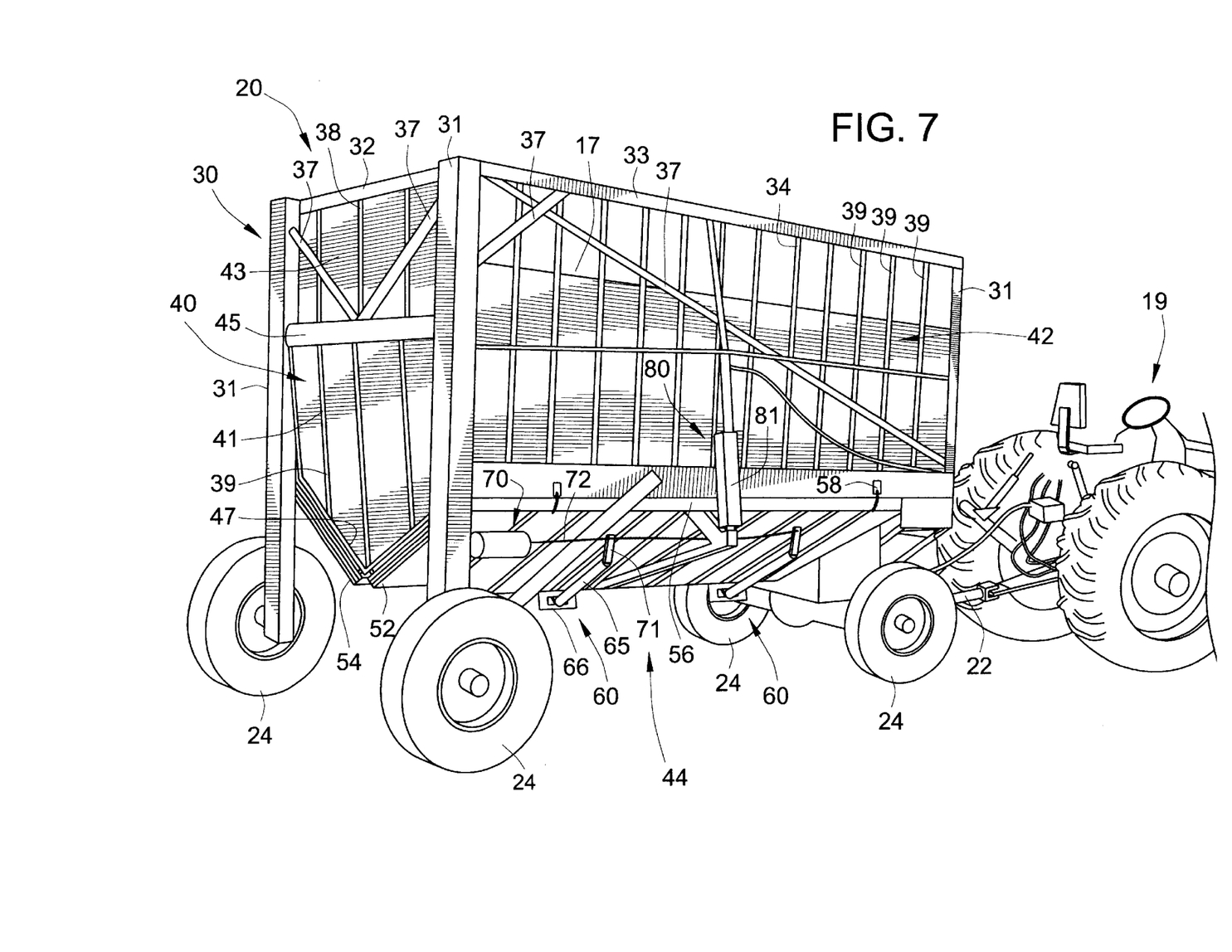

As shown in FIG. 7, when the actuator 81 has fully completed its movement, the doors 52, 54 are moved to the closed position, wherein the apertures 63, 64 engage the respective pegs 61, 62 shown in FIG. 8a, and the actuator 70 of the latch mechanism may be reset to cause the latches 60 to reset and hold the door 52, 54 in the closed position as shown in FIG. 9a.

It will be recognized that the closing mechanism 80 and its actuator 81, and the actuating mechanism 70 of the latches 60 are preferably hydraulically actuated. It will be readily recognized that as such, the controls for these mechanisms and their actuators may be remotely placed anywhere, preferably proximate to the tractor 19 within easy reach of its operator. Similarly, other mechanisms can also replace those described herein for latching, opening and closing the bottom doors, within the skill of a person in the art.

Figure 11A:
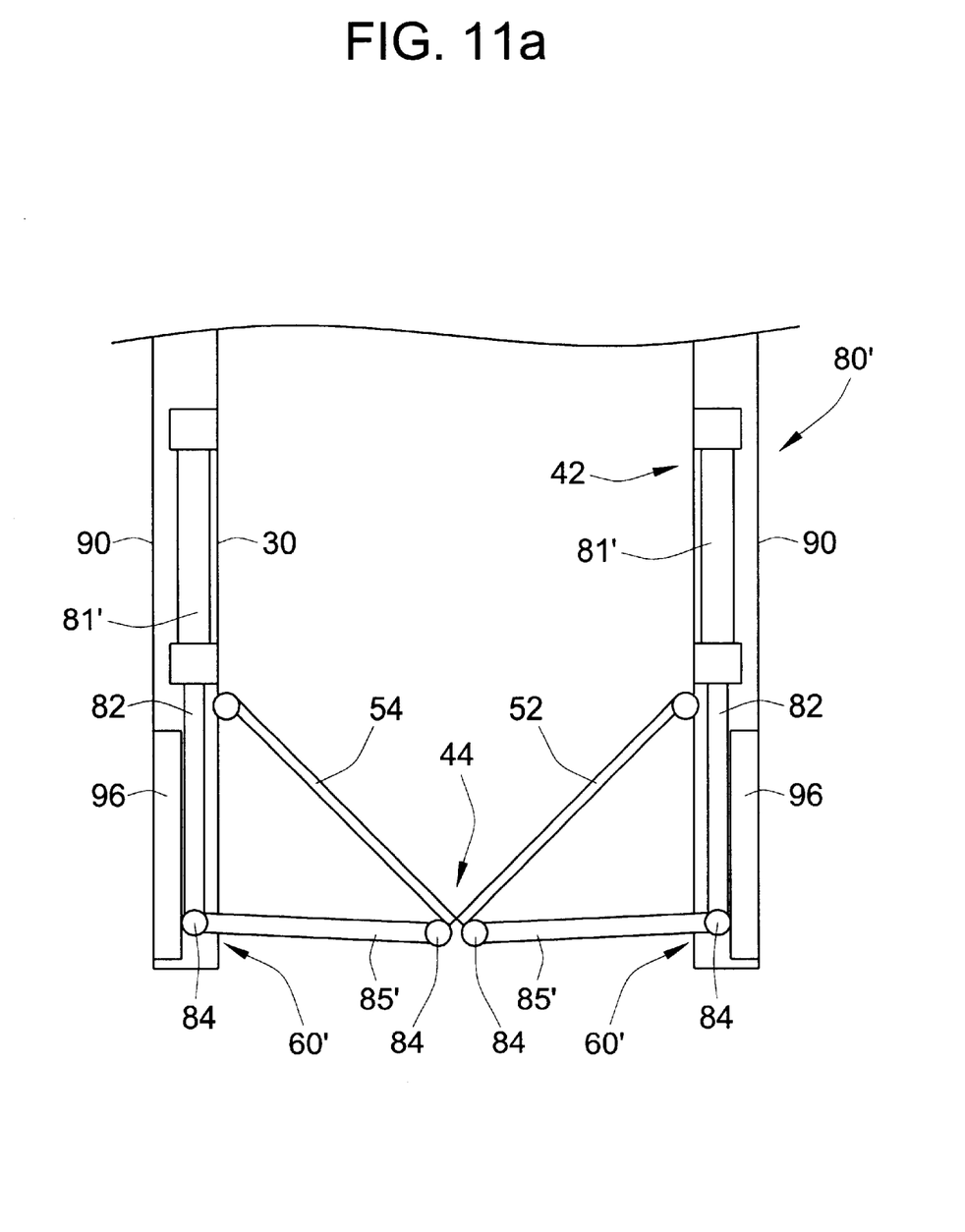
FIGS. 11a and 11b show an alternate embodiment of the closing mechanism and latch mechanism at various stages of operation, the views being taken from the rear.
Figure 11B:
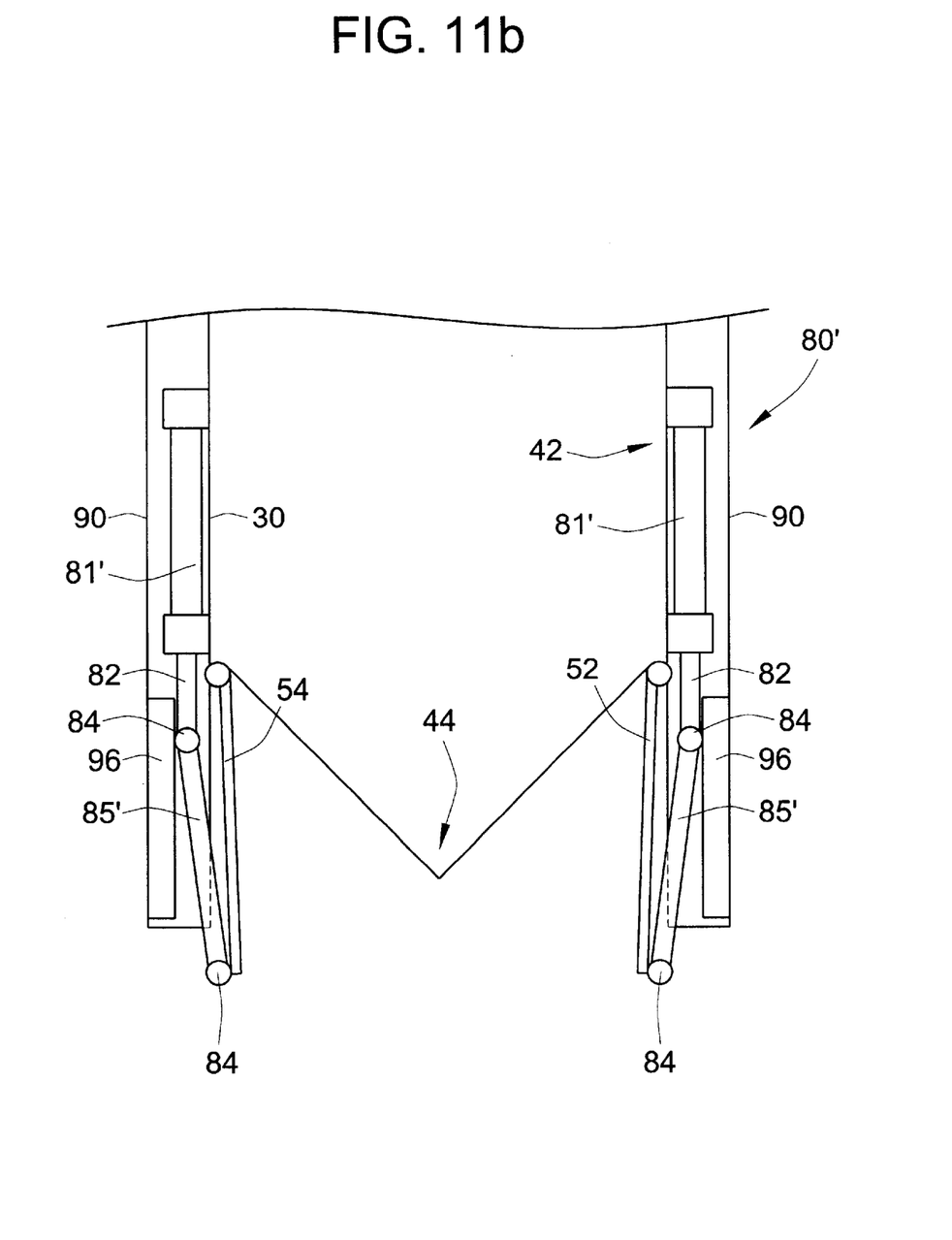

FIGS. 11a and 11b depict a partial cross-sectional view, taken from the rear, of the forage wagon 20 having an alternate embodiment of the latch mechanism 60' and the closing mechanism 80'. FIG. 11a depicts the closing and latching mechanisms 60', 80' positioning the bottom doors 52, 54 in the closed position, while FIG. 11b shows the doors in the open position. The alternate closing mechanism 80' generally comprises at least one tubular member 90 attached to the frame 30 on each opposing side 42 of the wagon. Preferably, each side 42 includes two longitudinally spaced actuating mechanisms 80', and hence two vertical tubes 90, which preferably are square. Each vertical tube 90 houses an hydraulic actuator 81' operating an actuating arm 82 extending downwardly from the actuator. Each actuating arm 82 is pivotally connected to a pivot arm 85' at 83. Each pivot arm 85' in turn is pivotally connected to an inner edge of the respective bottom door 52, 54 at 84.

Each pivot arm 85' is hingedly connected to the door 52 or 54, and also pivotally connected to the actuating arm 82, and hence as the actuator is retracted and the actuating arm 82 moves upwardly, the outer end of the pivot arm 85' moves upwardly and the arm 85' rotates in a counterclockwise fashion as shown in FIGS. 11a to 11b. This allows the bottom doors 52, 54 to rotate to an open position, i.e. to a generally vertical position of each door 52, 54. It will be recognized that the vertical tube 90 has an inner surface which includes a vertically extending slot (not shown) to receive the pivot arm 85' and allow it to rotate upwardly and inwardly. Further, the vertical tube 90 also includes at an outer surface a guide or bearing member 96 which supports the actuating arm 82 and its connection to pivot arm 85' at 84, providing an easy actuating surface for the entire mechanism to move upwardly and downwardly.

It will also be seen that an alternate latch mechanism 60' will be incorporated with and into the closing mechanism 80'. That is, a simple latch, such as one similar to that described earlier, is incorporated into the closing mechanism 80' to latch the pivot arm 85' to the vertical tube 90. An actuating mechanism 70 may be utilized to release or close the alternate latch 60'. For example, the latch 60' could simply be an actuated key that is connected to tube 90 and that works with a notch formed in the pivot arm 85', or otherwise engages the arm 85' to fix its position. When the latch is engaged, it will fix the pivot arm 85' to the vertical tube 90, thus allowing the pressure in the actuator 81' to be released as desired, i.e. such as for hooking and unhooking the hydraulic systems of the wagon when the doors 52, 54 are in a closed position. Preferably, the closing mechanism 80' and its actuator 81' and actuating arm 82 extend generally vertically. It is also preferable for each pivot arm 85' to extend generally horizontally, or preferably inclined as it extends from adjacent the center of the wagon 20 to the outer periphery and its attachment to closing mechanism 80' as shown in the figures. It will also be seen that the vertical tube 90 extends downwardly to a position below the hinged connection of the pivot arm 85' and the actuating arm 82 when in the closed position shown in FIG. 11a, to protect the mechanism.

It will thus be seen that the entire forage wagon 20 only requires two hydraulic systems to operate the entire unloading system, one to unlatch and one to close the doors. Further, the bottom doors 52, 54 are allowed to swing open under the force of gravity, providing quick and easy actuation. Further, the doors 52, 54 span the entire bottom area of the wagon 20, thus completely opening that area when moved to the open position providing a very large dispensing hole for releasing the contents of the wagon. This is further assisted by providing a rear door 41 which is pivotally mounted to the wagon 20 for swinging open to further increase the dispensing area of the wagon.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A forage wagon for loading and unloading a material, the wagon comprising:
   a pair of opposing sidewalls connected to a front wall and a rear wall, the walls extending vertically to define a storage chamber;
   a bottom wall formed by two bottom doors, each of the two bottom door having inner and outer edges, the outer edges pivotally connected to the opposing sidewalls;
   each of the two bottom doors being operable between a closed position for loading and an open position for unloading, the bottom doors rotating from the closed position to the open position under gravity, the closed position defined by the inner edges mating to form a substantially continuous bottom wall, the open position defined by the inner edges being spaced apart to form a bottom opening for unloading the material;
   wherein the rear wall includes a rear door, the rear door having a top edge and a bottom edge, the bottom edge mating with the bottom doors, the rear door pivotally mounted adjacent the top edge; and
   wherein the rear door includes a latch arm positioned to engage the bottom doors when in the closed position, movement of the bottom doors from the closed position to the open position freeing the latch arm and allowing the rear door to rotate, the latch releasing the rear door for pivotal movement upon release of the bottom doors from the closed position to the open position.

2. A forage wagon for loading and unloading a material, the wagon comprising:
   a pair of opposing sidewalls connected to a front wall and a rear wall, the walls extending vertically to define a storage chamber;
   a bottom wall formed by two bottom doors, each of the two bottom doors having inner and outer edges, the outer edges pivotally connected to the opposing sidewalls;
   each of the two bottom doors being operable between a closed position for loading and an open position for unloading, the bottom doors rotating from the closed position to the open position under gravity, the closed position defined by the inner edges mating to form a substantially continuous bottom wall, the open position defined by the inner edges being spaced apart to form a bottom opening for unloading the material;
   wherein the rear wall includes a rear door, the rear door having a top edge and a bottom edge, the bottom edge mating with the bottom doors, the rear door pivotally mounted adjacent the top edge; and
   wherein the material when contained in the wagon exits the bottom opening and forces the rear door to pivot outwardly to form a rear opening, the rear opening and the bottom opening combining to form a large dispensing opening.

3. The wagon of claim 2, further comprising a latch to retain the bottom doors in the closed position, wherein release of the latch frees the bottom doors to swing open under gravity to the open position.

4. The wagon of claim 2, further comprising an actuator operatively connected to the bottom doors to move the bottom doors from the open position to the closed position.

5. The wagon of claim 4, wherein the actuator is a hydraulic pump driving two hydraulic cylinders, one cylinder for each of the two bottom doors.

6. The wagon of claim 2, wherein the front wall defines a front opening for front loading.

7. The wagon of claim 2, wherein the bottom doors are angled inwardly and downwardly to form a general V-shape.

8. The wagon of claim 7, wherein the bottom doors are angled at between 30° and 60° relative to vertical.

9. The wagon of claim 7, wherein the rear door has a top edge and a bottom edge, the bottom edge having a general V-shape and mating with the bottom doors, the rear door pivotally mounted adjacent the top edge.

10. The wagon of claim 2, wherein the open position of the bottom doors defines the bottom opening that provides unobstructed clearance to the ground for the entire storage chamber.

11. The wagon of claim 2, further comprising a pair of front wheels and a pair of rear wheels supporting the wagon for travel, the rear wheels each being spaced laterally outside each of the sidewalls to straddle the material that is unloaded from the wagon.

12. The wagon of claim 11, wherein the rear wheels are independent of one another and are thereby free of an axle.

13. The wagon of claim 2, further comprising a frame linking the sidewalls, front wall, rear wall and bottom wall, the frame including posts extending vertically and beams extending horizontally and connecting the posts.

14. The wagon of claim 13, further comprising a pair of front wheels and a pair or rear wheels supporting the wagon for travel, wherein the posts include two rear posts, the rear wheels each being independently connected to one of the rear posts and spaced outwardly from the sidewalls.

15. The wagon of claim 2, wherein the bottom doors swing about an axis generally parallel to the direction of travel of the wagon.

16. The wagon of claim 2, wherein the bottom doors swing about an axis extending from the rear to the front of the wagon.

17. The wagon of claim 2, wherein the bottom wall is completely formed by the two bottom doors.

18. The wagon of claim 2, wherein the bottom opening completely frees the storage chamber for unloading.

19. The wagon of claim 2, wherein the bottom opening has a horizontal area about the same size as a horizontal area of the storage chamber.

20. A forage wagon for loading and unloading a material, the wagon comprising:
   a pair of opposing sidewalls connected to a front wall and a rear wall to form a wagon structure, the walls extending vertically to define a storage chamber;
   a bottom wall including a bottom door, the bottom door being movable between an open position to create a bottom opening for gravitationally unloading a material held in the storage chamber and a closed position for holding a material in the storage chamber;
   a rear door provided along a bottom portion of the rear wall, the rear door movable between an open position to create a rear opening in the bottom portion of the rear wall and a closed position for holding the material in the storage chamber;
   wherein the bottom opening combines with the rear opening when the bottom door and the rear door are open for unloading a material through the bottom opening;
   wherein the material when contained in the wagon exits the bottom opening and forces the rear door to pivot outwardly to form the rear opening, the rear opening and the bottom opening combining to form a large dispensing opening;

a plurality of wheels supporting the wagon structure to provide for movement of the wagon structure.

21. The forage wagon of claim 20, further comprising first and second rear support posts on opposing sides of the rear wall and rear door, each post having one of the wheels mounted thereto and being free of an axle to avoid interference with a material when unloaded through the bottom opening.

22. The forage wagon of claim 20, wherein said bottom door includes two bottom doors pivotally connected to the pair of opposing side walls, respectively, and wherein the rear door is pivotally connected to a top portion of the rear wall, the rear door when closed being adjacent to corresponding sides of the bottom doors.

* * * * *